(12) United States Patent
Pack et al.

(10) Patent No.: US 8,468,482 B1
(45) Date of Patent: Jun. 18, 2013

(54) MODELING AND SIMULATING THE IMPACT OF IMPERFECTLY PATTERNED VIA ARRAYS ON INTEGRATED CIRCUITS

(75) Inventors: Robert C. Pack, Morgan Hill, CA (US); William Wai Yan Ho, Cupertino, CA (US)

(73) Assignee: Worldwide Pro Ltd., Hong Kong (CN)

( * ) Notice: Subject to any disclaimer, the term of this patent is extended or adjusted under 35 U.S.C. 154(b) by 50 days.

(21) Appl. No.: 13/047,621

(22) Filed: Mar. 14, 2011

Related U.S. Application Data

(60) Provisional application No. 61/313,566, filed on Mar. 12, 2010, provisional application No. 61/314,268, filed on Mar. 16, 2010.

(51) Int. Cl.
*G06F 17/50* (2006.01)
(52) U.S. Cl.
USPC .......................................... 716/110
(58) Field of Classification Search
USPC ................................ 716/100, 110
See application file for complete search history.

(56) References Cited

U.S. PATENT DOCUMENTS

| | | | | |
|---|---|---|---|---|
| 2007/0174801 A1* | 7/2007 | Park et al. | ........................ | 716/8 |
| 2008/0050676 A1* | 2/2008 | Hoshino | ........................ | 430/296 |
| 2009/0064083 A1* | 3/2009 | Ikeuchi | ........................ | 716/19 |

* cited by examiner

*Primary Examiner* — Suchin Parihar
(74) *Attorney, Agent, or Firm* — Aka Chan LLP

(57) ABSTRACT

A technique models and simulates the impact of imperfectly patterned via arrays on integrated circuits through the use of hierarchical models and a hierarchical circuit simulator. Through the hierarchical modeling and simulation approach discussed here, far more accurate electrical simulation and verification of networks is enabled for; performance, yield, and reliability. The approach further enables simulation of the effects of via process variations on large-scale circuit response. In an implementation, each via in a layout or in a via array is modeled as having an independent size from other vias based upon calibrated process simulation. The electrical characteristics of independent vias and via arrays are modeled and compiled into a reusable hierarchical distributed resistance via model. Hierarchical simulation is performed using these hierarchical distributed via models and enables more accurate results than traditional approaches.

18 Claims, 15 Drawing Sheets

MODELING AND SIMULATING THE IMPACT OF IMPERFECTLY PATTERNED VIA ARRAYS ON INTEGRATED CIRCUITS

CROSS-REFERENCE TO RELATED APPLICATIONS

This application claims the benefit of U.S. provisional patent applications 61/313,566, filed Mar. 12, 2010, and 61/314,268, filed Mar. 16, 2010, which are incorporated by reference along with all other cited references in this application.

BACKGROUND OF THE INVENTION

The present invention relates to the design of integrated circuits, and more specifically, to methods and systems for modeling and simulating the impact of imperfectly fabricated vias and redundant via arrays on the performance and reliability of an integrated circuit.

The age of information and electronic commerce has been made possible by the development of electronic circuits and their miniaturization through integrated circuit technology. Integrated circuits are sometimes referred to as "chips" or "ICs."

To meet the challenges of building more complex and higher performance integrated circuits, various specialized software tools are used. These tools exist in one or more areas commonly referred to as; computer aided design (CAD), computer aided engineering (CAE), electronic design automation (EDA), or technology computer aided design (TCAD).

There is a constant need to improve these tools for each technology generation in order to address the requirements for; higher integration, greater functional capability and complexity, smaller chip area, and better performance of integrated circuits. Additionally, driven by technology requirements, certain tools and capabilities developed in the TCAD domain, traditionally focused on small-scale advanced technology development, are moved and recast for the large-scale EDA domain in order to address more sophisticated effects as they become more significant in IC design.

At the same time and despite significant increase in logic function and complexity, for each technology generation, inherent manufacturability, yield, and reliability must be maintained or improved and specialized design for manufacturability (DFM) tools are necessary and must be used in integrated circuit design flows for this purpose. These tools are typically and primarily driven by the photolithographic patterning and pattern transfer processes which enable miniaturization for each successive process generation but do so with limited patterning fidelity. As such, these tools have primarily been focused on optimizing the geometrical shape fidelity of the features defining the physical circuit in the lateral planes of the manufactured chip. To achieve this, highly planar layers are required as well and great effort is expended to add dummy features to aid in planarization with the unavoidable consequence of greater parasitic coupling of signals to the dummy features. These inherent nanoscale technology effects and others mandate greater analysis of these non-idealized shapes and dummy features to determine and minimize their impact on the functional performance of the IC.

When DFM tools are primarily driven by electrical function metrics rather than geometrical shape, they are often referred to as electrically-driven DFM (eDFM) tools. eDFM tools are typically limited by circuit simulator capacity and runtime constraints as well as the large number of non-ideal physical features which must be considered in such a methodology for accurate results.

As IC interconnect, via, and device critical dimensions are reduced and/or system frequency is increased many additional so-called "parasitic" RLC effects must be considered. These parasitic effects can cause unwanted cross-coupling of signals, a reduction in signal voltage, or reduction or noise in signal, clock, and power distribution networks. These effects should properly be accounted for in simulation of the IC. If not, there is increased risk that the IC will have functional failure or performance limitations following fabrication and incorporation into an end product. The number of parasitic effects has been increasing for each process generation and with increases in circuit size, complexity, and function simulating the impact of these parasitics is an enormous challenge requiring very large computing resources and time. The variation in not only the fine line wire interconnects but also the vias which interconnect these wires fall within this category and we are primarily focused on the influence of via variations on the electrical performance of an IC in this documents. Myriad variations impact integrated circuit performance and reliability and should be accounted for in any robust integrated circuit design flow. For nanoscale IC designs, in general, variations occur in many forms and their impact on the IC function may be very non-intuitive. These variations occur even for a well-controlled fabrication processes simply due to fundamental physical limits dictating the resolution, planarity, or homogeneity of the physical circuit elements. Patterned features are far from ideal resulting in geometrical feature distortions and variations in the distributed resistance, capacitance, and resistance of clock, signal, or power network. Inter-layer dielectric and metal layer thickness variations also occur and further compound the problem difficulty. Additionally, intrinsic variations due to fundamental material properties include statistical material inhomogneities of the various layers comprising the integrated circuit and may impact interconnect as well as active devices such as for example through deposited material inhomogeneity and statistical dopant fluctuation. Variations may also be exhibited in either/both intra-die or inter-die manner, meaning that the variations may be the same for each die or different for each die across the wafer of dice. An example of the former is due to pattern-dependent proximity effects such as from the photolithography process wherein constructive and destructive interference effects occurring during partially-coherent imaging causes critical feature shape variations. Examples of the latter include deposition or etch chamber effects impacting the across-wafer uniformity of a given process. These effects may also be time-varying as well. These variations increasingly must be accounted for during a well designed IC to reduce functional sensitivity to inherent variations in the fabrication of the IC.

Interconnect problems for large ICs manufactured with nanoscale technology are known to contribute to significant chip failures and performance reduction and are a key concern in IC design. There are many factors that must be considered and addressed in order to ensure a robust inherently high-yielding and reliable design. One such factor which is critical is associated with via or contact failures or marginal high resistance vias. These may be significant factors in chip failures, performance reduction, or in-field reliability. Both signal and power nets are impacted. A typical integrated circuit includes an enormous number of vias connecting the various metal layers of an IC or which contact the silicon device and the complete failure or partial failure (e.g., leading to a higher than expected resistance) of any one or number of vias in a series can lead to a failure or reduction in reliability of the chip.

Vias are found in all integrated circuits including digital signal processors (DSPs), amplifiers, dynamic random access memories (DRAMs), static random access memories (SRAMs), erasable programmable read only memories (EPROMs), electrically erasable programmable read only memories (EEPROMs), Flash memories, microprocessors (e.g., CPUs), graphic processors (e.g., GPUs), physics processors, embedded processors (e.g., ARM and MIPS cores), application specific integrated circuits (ASICs), and programmable logic. However, the problem is typically most severe for large area ICs which typically have long wire lengths.

Vias or via arrays for the lower metal levels of an IC are among the most lithographically sensitive structures in a nanoscale integrated circuit. Lithographically resolving these features is not only is it an enormous process challenge but pattern fidelity and dimensional tolerances are particularly highly susceptible to small photomask errors due to the mask error factor (MEF) effect wherein the error of a mask is greatly amplified for these features further compounding the problem. But even further compounding the problem is the lithographic focus latitude dictating a very small acceptable process window over which acceptable lithographic patterning will occur. As a result of these patterning difficulties as well as other associated process variations, such as with deposition and etch, vias used for supplying a stable constant voltage to the internal active devices or transmitting critical clock or logic signals of an integrated circuit can be significantly different from ideal extraction assumptions. Consequently, critical voltage and current values distributed throughout the IC may easily fall out of the designer's desired specified range. For example, they may have significantly higher resistance than typically assumed by electronic design automation (EDA) extractors, they may be more highly variable, and they may even conduct current in a manner which is not well considered by designers. These and other factors now make vias a principle current-resistance (IR) drop and electromigration (EM) yield-limiting mechanism which must be considered far more rigorously than in past process technology generations.

Both via-based IR drop and current-density induced electromigration can be significant causes of yield loss necessitating costly silicon respins. A small drop in VDD or increase in local ground voltage can severely impact leakage or clock speed performance in low-voltage designs, so it is imperative to have well-controlled voltage down to the transistor level. To improve reliability and reduce current density, redundant vias are commonly used, however the methodology for insertion and verification is often dictated by heuristic rules or based on test structures rather than rigorous analysis of the actual circuit.

Clock and logic signal wiring typically do not use a large degree of redundant vias for reasons of performance. The tradeoff can be reduced reliability as current density is increased and the impact of via size variations can have a much greater impact.

In terms of capacity, the vast number of real drawn vias in a typical modern integrated circuit may be orders of magnitude beyond what most existing circuit simulation tools are capable of. So it has not been possible to accurately assess the impact of vias on large circuits due to capacity and speed limitations of SPICE-accurate simulators. As a result, vias and redundant via arrays are typically simplified in a network which results in underestimating the resistance, variability, and limiting the accuracy of the result.

While vias in traditional IC technology are used to connect different layers on side of an IC they are also used to connect layers which exist on both sides of an IC and to connect stacked ICs. In this mode, these vias are typically called through-silicon vias (TSVs). By use of TSVs three-dimensional integrated circuits, or 3D-ICs, are created. Both signals and power may be connected through the use of TSVs connecting different ICs in a 3D-IC. An added difficulty with TSVs over conventional vias is associated with potential substrate current injection.

Therefore, what is needed is a system and technique to enable simulation-based verification of vias and via arrays in an accurate and nonreduced manner to confirm satisfactory IR drop and current density over a range of typical manufacturing conditions. Moreover in the event of an error, the simulation tools should provide a direct one-to-one layout isolated view of the error to enable quick analysis and repair. Further, what is also needed are tools which enable enormous capacity and speed without resorting to accuracy-reducing compromises.

BRIEF SUMMARY OF THE INVENTION

A technique models and simulates the impact of imperfectly patterned via arrays on integrated circuits. The electrical characteristics of vias and via arrays are both modeled in a far more accurate way than in the past while enabling simulation of these effects within a full large-scale design. In an implementation, each via is modeled as having an independent size from other vias in the same array. This is extracted into a distributed resistance via model for the array. Simulation is performed using this distributed via model and produces more accurate results than using a lumped model for each via array.

A method creates accurate circuit simulation models of via arrays by using a process simulation to determine accurate manufactured via shapes, generating a distributed lumped element circuit simulation model representative of the geometries and electrical properties, compiling these models into reusable hierarchical circuit cells. These reusable hierarchical via array models can then be used following a hierarchical replacement of the vias in an extracted netlist or in a compiled representation of the extracted netlist.

The electrical characteristics of vias are accurately modeled and simulated. In a verification flow, electrical via failures are detected. We can significantly reduce the incidence of via-caused power, clock, or other signal network failures.

A technique of the invention overcomes these limitations by enabling accurate via analysis and high-speed reusable models of detailed via arrays. Individual via-level IR drop or electromigration analysis is therefore possible on very large SPICE netlists. The approach furthermore is attractive for variation analysis due to its inherent efficiency and fundamentally high-computational accuracy. In a verification or analysis embodiment, the present invention can significantly reduce the number of silicon-respin failures due to previously-unaccounted for IR drop at vias or current-density induced electromigration failures.

Aspects of the invention pertain to integrated circuit design, verification, and simulation. A method is presented for modeling and simulating the impact of imperfectly fabricated vias or via arrays on power distribution, performance, reliability, and design-for-manufacturability (DFM) signoff verification of integrated circuits. This improvement upon the state-of-the-art has significant likelihood for enabling improved verification tools which are capable of detecting IR drop and electromigration problems in a design well before manufacturing thereby adding significant value to the quality and inherent manufacturability of the design.

In an implementation, a technique includes:

1. Creating far more accurate circuit simulation models of via arrays through use of process simulation to determine accurate manufactured via shapes.

2. Generating a distributed lumped element circuit simulation model representative of the geometries and electrical properties 3. Compiling these models into reusable hierarchical via array models.

4. These reusable hierarchical via array models can then be used following a hierarchical replacement of the vias in an extracted netlist or in the compiled representation of the extracted netlist.

Both the compiled representation of the interconnect netlist and the reusable via cells are mathematically complete and accurate following a KVL, KCL, and energy conservation validation check. For example, see U.S. Pat. No. 7,461,360, issued Dec. 2, 2008, and U.S. patent application Ser. No. 12/238,880, filed Sep. 26, 2008, which are incorporated by reference. The technique of the invention can work in conjunction with the techniques described by these patent applications.

Even though distributed lumped element models of the via arrays may be far more sophisticated than the simple lumped element models output by the extractor, this does not mean that they are slow to execute. The compiled form can be very fast to execute.

The approach by these techniques enables far more accurate analysis by properly considering the distributed current flow in non-ideal via arrays enabling both better IR drop accuracy and spatial identification as well as also far better current density accuracy for electromigration analysis. Despite the great improvement in accuracy, the approach can be far faster than one might presume given the speed of compiled models and true hierarchical simulation.

In various implementations, a method is provided for modeling and simulating the impact of imperfectly fabricated via arrays on power distribution and performance of integrated circuits. A method is provided for extracting electrical RLC values of a via array from a layout using TCAD modeling. A method is provided for forming a detailed 3D via-array simulation netlist model from process simulation.

A method is provided for forming a compiled 3D via-array model from process simulation. A method is provided for improving power network simulation accuracy by using a distributed lumped element model which accounts for via shape and size as well as distributed wiring or contact region resistivity. A method is provided for improving power network simulation speed by replacing via arrays in a detailed interconnect netlist or compiled model of the same with a compiled via subcircuit model.

A method is provided for modeling and simulating current direction dependent effects in via array models. A method is provided for evaluating or verifying electromigration in via arrays through a distributed resistance model. A method is provided for evaluating or verifying IR voltage drop across an individual via in large power networks. A method is provided for verifying and identifying via limited-yield locations on a physical layout due to high IR drop, high current density, or high electromigration failure likelihood.

In an implementation, the method for simulating an electronic component includes: providing an extraction of an electronic component, such as an integrated circuit with clock, signal, and power nets; using the extraction; compiling an interconnect model, comprising a circuit represented by a first model where at least one electrical parameter values (such as capacitance, resistance, and inductance) has been simplified; using the extraction, compiling a plurality of second models, each comprising a circuit cell (such as a circuit with multiple vias) with more electrical parameter values of the electronic component than the first model; indicating a system of the electronic component such as the clock, power, or signal components of a system; and then performing a simulation. This simulation includes substituting a first model associated with the interconnect model corresponding to the at least one circuit with one of the second models, while other circuit cells not associated with the system continue to be represented using the first model; and calculating simulation results for a first block of the electronic component using a substituted second model.

Although the first and second models in the sample implementation above were generated by the extraction, a specific embodiment of the invention checks the spatial representation of a circuit before generating the models. If the spatial representation of the circuit matches another model previously generated, a link is established to the preexisting model and no model for that specific circuit has to be generated.

The circuit can be a via cell, which has multiple vias. In a specific implantation of the first model, the via cell has at least two vias, but the electrical parameters of the via cell have been simplified. For example, the resistance of multiple vias in the via cell have been reduced to a single resistance. Additionally, the spatial location of the vias in the via cell for the first model are simplified. Instead of storing the actual via locations (e.g., the north, east, west, or south areas of the via cell), the via cell first model represents the via at a single location in the via cell, usually at the center of the via cell.

In another example, the simulation result of the electronic component includes checking if whether the current density distribution through an electronic component has been exceeded. If so, a message a generated.

The invention can also simulate whether laws of electricity are violated, such as Ohm's law and Kirchhoff's law. If they are violated, a message is generated.

In another implementation, a method for simulating an electronic component includes: providing a first extraction model of an integrated circuit design, comprising a via where the number of resistance values have been simplified; running a first simulation that is then partitioned into a first block; using the extraction to identify the vias that are a member of a selected net; replacing at least one of the vias in the selected net with more information of the via than with the first extraction model; simulating the integrated circuit design with the replaced via of the selected net. This simulation includes: reusing results from the first simulation; recalculating any first simulation results that are dependent on the selected via cell; and outputting the results onto a screen.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
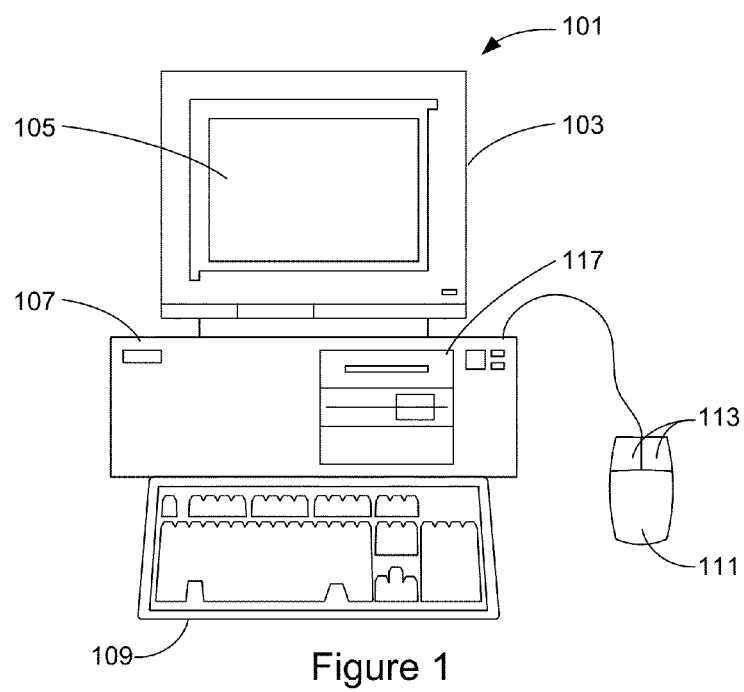
FIG. 1 shows a system of the present invention for modeling and simulating an impact of via arrays on integrated circuits.

FIG. 1 shows a system of the present invention for modeling and simulating an impact of via arrays on integrated circuits. In an embodiment, the invention is software that executes on a computer workstation system, such as shown in FIG. 1. FIG. 1 shows a computer system 101 that includes a monitor 103, screen 105, cabinet 107, keyboard 109, and mouse 111. In some implementations, however, the modeling and simulating systems are operated headless, which means these systems will not have a mouse, keyboard, display, and so forth. Mouse 111 may have one or more buttons such as mouse buttons 113. Cabinet 107 houses familiar computer components, some of which are not shown, such as a processor, memory, mass storage devices 117, and the like.

Mass storage devices 117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these. A binary machine-executable version of the software of the present invention may be stored or reside on mass storage devices 117. Furthermore, the source code of the software of the present invention may also be stored or reside on mass storage devices 117 (e.g., magnetic disk, tape, CD-ROM, or DVD).

A computer-implemented version of the invention may be embodied using, or reside on, computer readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 117. The source code of the software of the present invention may also be stored or reside on mass storage device 117 (e.g., hard disk, magnetic disk, tape, or CD-ROM). As a further example, code of the invention may be transmitted via wires, radio waves, or through a network such as the Internet.

Figure 2:
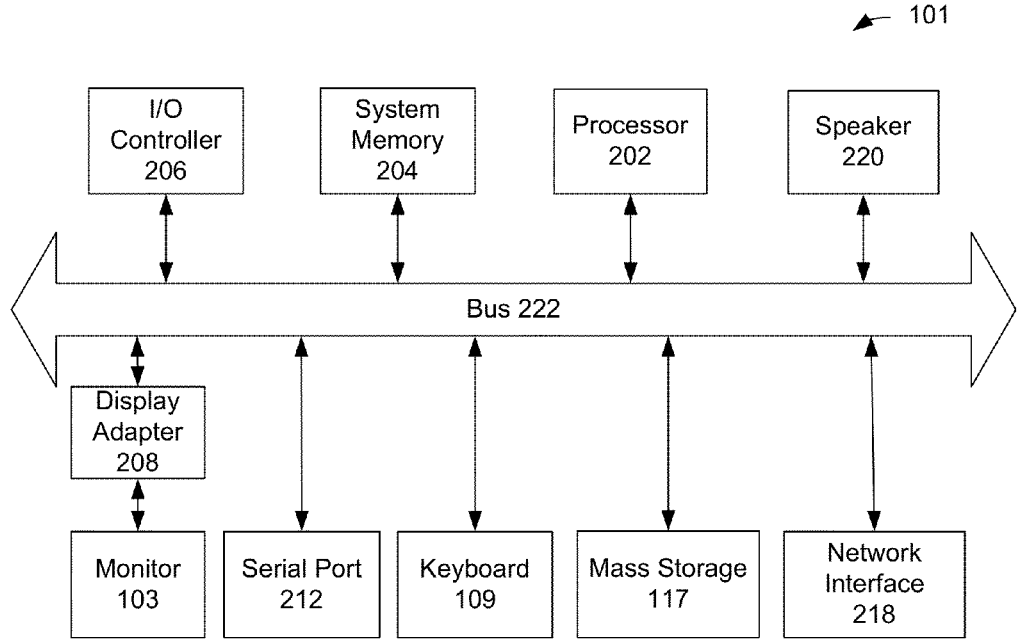
FIG. 2 shows a simplified system block diagram of a computer system used to execute software of the invention.

FIG. 2 shows a system block diagram of computer system 101 used to execute software of the present invention. As in FIG. 1, computer system 101 includes monitor 103, keyboard 109, and mass storage devices 117. Computer system 101 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal ethernet network, Internet, or other network. Some examples of distributed computer systems for solving problems over the Internet include Folding@home, SETI@home, and the Great Internet Mersenne Prime Search (GIMPS).

Arrows such as 222 represent the system bus architecture of computer system 101. However, these arrows are illustrative of any interconnection scheme serving to link the subsystems. For example, speaker 220 could be connected to the other subsystems through a port or have an internal connection to central processor 202. Computer system 101 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MatLab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Other operating systems may be used. Each computer in a distributed computing environment may use a different operating system.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

A specific type of electronic design automation tool is a circuit simulation program or system. A circuit simulation program performs analysis of circuits containing resistors, capacitors, inductors, mutual inductors, independent voltage and current sources, dependent sources, transmission lines, and semiconductor devices including diodes, bipolar junction transistors (BJTs), junction field effect transistors (JFETs), and metal over semiconductor field effect transistors (MOSFETs). A circuit simulator may perform nonlinear DC, nonlinear transient, linear AC, and other analyses.

One circuit simulation program is SPICE, originating from the University of California, Berkeley. SPICE stands for "Simulation Program Integrated Circuits Especially!" Despite the success of SPICE and other circuit simulation programs, existing circuit simulation programs use methodology and computational techniques not suitable for use in distributed computing environment and determining real or exact solutions.

Power, clock, and signal interconnects in large dense system-on-a-chip (SOC) integrated circuits fabricated with nanoscale process technology and emerging stacked-chip 3D-IC technology have become very important and critical areas of focus. Myriad factors must be considered particularly in light of nanoscale process effects and long wire lengths which contain a large number of vias including physical circuit shape variations impacting resistance and current density. Two particularly critical factors are voltage or IR drop and electromigration which impact performance, power, yield, and the lifetime of integrated circuits. However, there have been no SPICE-accurate tools available with the capacity and speed capable of taking into account these often process- and pattern-limited effects for large system-on-a-chip integrated circuits at the level of detail required. Tools of this invention overcome this limitation of the prior art and enables simultaneously both larger as well as more detailed verification and simulation of integrated circuits.

Typically, circuit simulators used for power network, clock, and signal analysis, due to the capacity and speed limitations mentioned, cannot handle an accurate netlist representation of an ideal layout which capture details at a level required for proper eDFM analysis and verification.

Therefore parasitic extraction tools responsible for generating a detailed RLC netlist from the layout are used in a manner which purposely reduces the number of RLC elements to suit the capabilities of the simulator being used. Often critical features which impact performance, yield, or reliability are reduced out of the netlist removing one's ability to explore their impact on the circuit.

Capacity is an overwhelming problem for many circuit simulators primarily due to their inability to process circuits in a true hierarchical manner. Moreover, we are concerned with not just the ideal netlists but the real processed physical geometries patterned on the wafer which comprises an IC and the proper electrical equivalent circuit netlist of such geometries. These physical circuit feature geometries in the nanoscale process era may be far from the ideal drawn shapes and have electrical values significantly different from those of the drawn shapes and they may vary based upon a number of process and layout parameters. When these shape variations result in significant electrical consequences in the IC, they should be considered in a robust design flow.

Transistor gate variations such as lithographic process patterning effects are accounted for in circuit level-simulation due to the fact that these variations have large potential impact on leakage and/or device performance.

It is now important to consider the impact of processing effects which impact interconnect performance and reliability.

A particularly process-sensitive physical interconnect circuit feature, vias and via arrays, have been largely ignored by EDA and design-for-manufacturing (DFM) products despite their importance and impact on today's nanoscale technology integrated-circuit yield. The industry has ignored this problem because of the sheer number and difficulty of simulating them accurately. As a result, tools have not been available even though it has become very important to account for all sources of IR drop and likely failure modes due to electromigration. With the availability of true hierarchical circuit simulation, made possible by technology of the invention, it is now possible.

Not only is there an enormous quantity of vias in today's IC interconnects, for nanoscale nodes many of these are now critical and highly process-sensitive due to their size as well as process- and pattern-dependent proximity effects. Resistance variations of these vias can be significant across normal process excursions but in aggregate, especially for nested vias, these variations can in turn impact the integrated IR drop across the relatively long wires leading to critical active devices. This IR drop can be a key cause of any number of leakage or performance failures particularly for low-voltage devices which are more sensitive to this voltage drop.

IR drop and electromigration can be significant due to process- and pattern-limited physical circuit structural variations. For this reason, it is advisable to have a one-to-one correspondence between the layout and the netlist. When such exists, through a netlist annotated GDSII, a spatially-annotated netlist, or other means, the designer can easily verify IR drop or electromigration of physical features at the DRC or silicon-DRC level and correct the problem during layout editing.

A principle cause of imperfect wires and vias in nanoscale process technology is limitations of the lithographic patterning and damascene copper processes. The optical lithography, etching, and deposition processes involved each have their own limitations which add up to nonideal physical structures which in turn result in effective piecewise or lumped element networks which are different from expected.

Moreover, process variations which change the cross-section of a wire or via, can reduce the in-field lifetime and reliability of an integrated circuit product due to current density driven electromigration.

Up to now, power analysis tools have been severely limited in terms of capacity and speed. For the user of these tools, the user will reduce the power network size by simplifying the circuit into a fewer number of lumped network elements and to simplify the models of the active and passive components. This reduction typically takes place in any or all of a number of tools including the interconnect extractor as well as the circuit simulator; sometimes without knowledge of the designer.

For example, in power or signal interconnect extraction, via arrays are often reduced to a single effective resistor and long wires are reduced to simple distributed RCL Pi networks. Moreover the feature sizes and shapes are considered to be the ideal layout shapes rather than the actual shape printed on the silicon wafer such as determined by technology computer aided design (TCAD) simulation. The network may be further reduced by the circuit simulator if it is of the so-called "fast-SPICE" class of simulators. Such simulators do not provide exact results, but provide estimated results.

A number of problems occur resulting from the resulting network reduction. First, network reduction destroys the one-to-one network correspondence between the network element and the physical structure. Second, network reduction results in simulation errors which over or underestimate the distributed IR drop along the path to an active device. Finally, network reduction completely overlooks a principle yield reduction mechanism at the via array level.

The results of this are significant errors which can impact the yield or reliability of an integrated circuit. The impact of which can cost millions even for the smallest of errors. Every integrated circuit manufacturer has probably encountered this problem if not once a number of times at great expense and given the cost of failure new verification.

FIGS. 3-6 show a system of performing circuit simulation using a hierarchical circuit simulation technique. A specific implementation of a flow for modeling and simulating the impact of imperfectly patterned via arrays on integrated circuits is presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different or alternative order than presented, or any combination of these. Certain steps may be repeated as needed. Further, the steps in other implementations of the invention may not be exactly the same as the steps presented and may be modified or altered as appropriate for a particular application or based on the circumstances.

Figure 3:
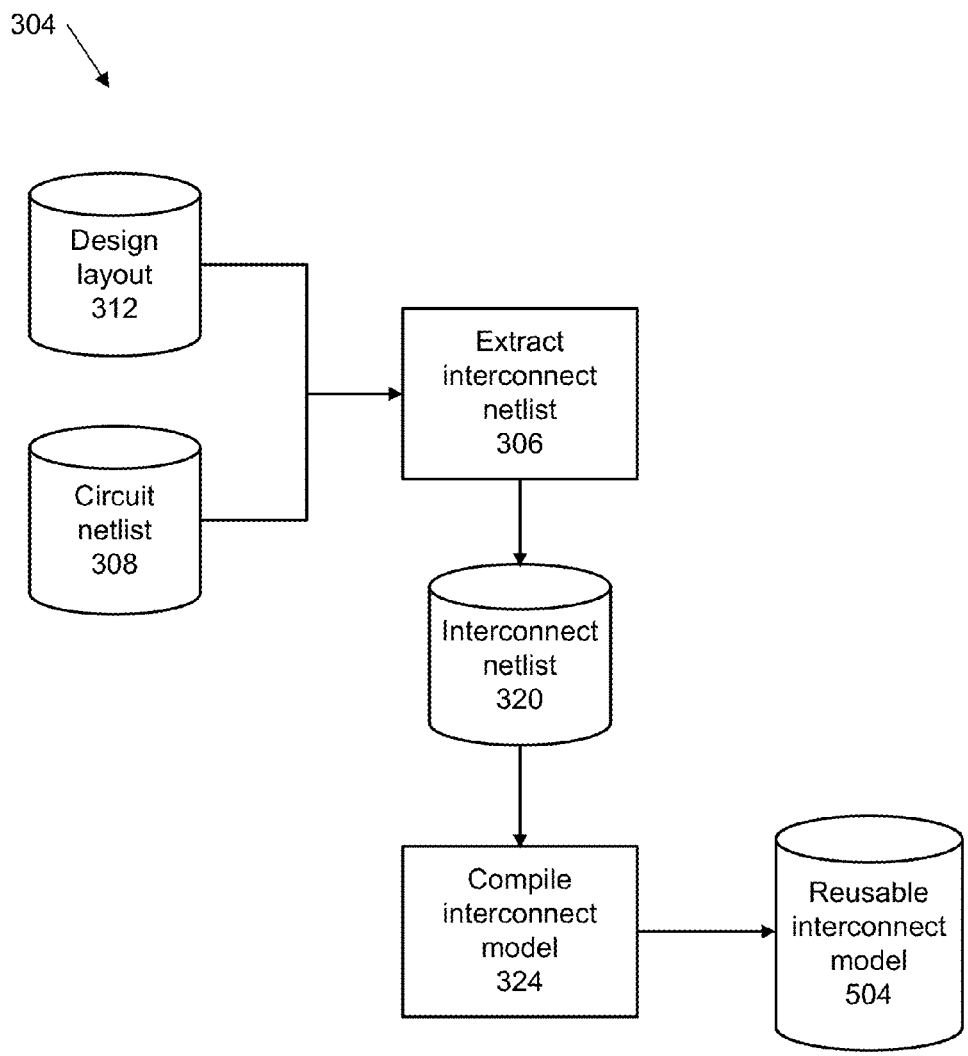
FIG. 3 shows a flow for compiling a reusable interconnect model.

FIG. 3 shows a flow 304 for compiling a reusable interconnect model. Once compiled, the model can be reused in multiple, subsequent simulations without needing to recompile the model again.

In a step 306, an interconnect netlist is extracted from a circuit netlist 308 and a design layout 312. Netlist 308 and layout 312 describe the circuitry to be simulated or evaluated. The netlist specifies the components and connectivity of the circuitry. Components can include gates, devices, transistors, cells, logic blocks, input buffers, output buffers, memory cells, decoders, arithmetic logic unit (ALU), and other circuit blocks. The connectivity includes power and ground wiring (carrying respectively, VDD and 0 volts) and the signal interconnect, which carry Boolean signals (representing 0 or 1) that propagate between different logic blocks of the circuitry.

The layout specifies the geometries of a layout of the circuitry. These geometries include the polygons for the various mask and process layers. The netlist and layout may be stored in a database file. The layout may be stored in the GDSII stream format file or other file or database formats used to store the layout or mask data.

As a result of extraction 306, an interconnect netlist 320 is created. The interconnect netlist can be stored in a file, such as a database file (stored on a hard disk or server) for use by other processes or flows. For example, the netlist is used in a flow described in FIG. 4.

In a step 324, using interconnect netlist 320 as input, a reusable interconnect model 504 is compiled and created. The interconnect model can be stored in a file, such as in a database file, for use by other processes or flows. For example, this interconnect model is used in a flow described in FIG. 5.

A specialized circuit simulator is used to compile the interconnect model.

Figure 4:
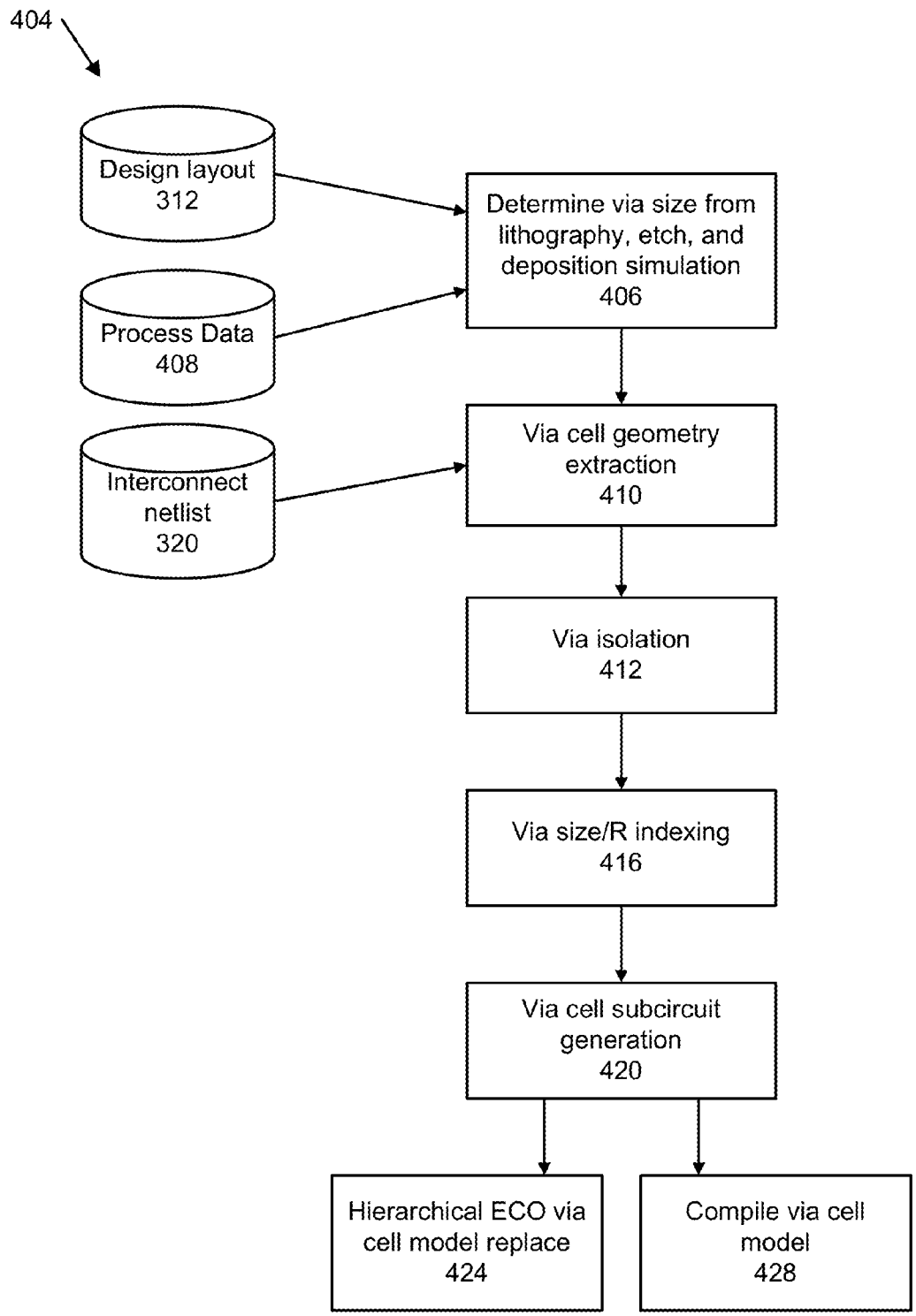
FIG. 4 shows a flow to generate a via cell subcircuit and compile the reusable via model.

FIG. 4 shows a flow 404 to generate a via cell subcircuit. In a step 406, using design layout 312 and process data 408 as input, a simulation of a via mask is performed using a calibrated lithography simulator to accurately determine the shape and size of the vias that would be printed on an actual fabricated wafer. In practice, the via mask includes resolution enhancement technology (RET) features such as optical proximity correction (OPC) and subresolution assist features (SRAF) to help mitigate the distortions and shallow depth of focus inherent in lithographic imaging and patter definition processes. After the via simulation, in a step 410, using interconnect netlist 320 as input, the via cell geometry is extracted. In a step 412, vias are isolated. In a step 416, via size and resistance (R) is indexed using a calibrated model of the resistance versus via size distribution for the specific process such as shown in FIG. 10B. In a step 420, all via cells subcircuit are generated.

In a step 424, using the generated via cell subcircuit as input, a hierarchical engineering change order (ECO) via model may be replaced. In a step 428, using the generated via cell subcircuit as input, the via cell model is compiled by the hierarchical simulator.

An integrated circuit design is typically specified using a design layout 312, process data 408, and interconnect netlist 320. These may be stored as database files. The design layout gives a graphical representation (e.g., geometries of the layout) of the integrated circuit. The connectivity information is contained in the interconnect netlist, which gives the components (e.g., transistor, resistors, pass gates, logic gates, and so forth), and the interconnect connections between the components. The process data gives information on for the specific process being used to, such as, resistance per square, transistor parameters, device parameters, and other related process information. The process data is useful for more accurately simulating the circuitry, so parasitics can accurately be calculated and modeled.

In step 410, the integrated circuit design is extracted, such that the design layout and interconnect netlist are interrelated. A common extraction file includes a DSPF file. With the extraction, one can compile a model, such as an interconnect model. The extract gives the connectivity of the circuit, and by tracing, the system can obtain the features or components along this connectivity path. In a specific implementation, this component is the via cell, but in other implementation, the component can be other features of an integrated circuit design (e.g., geometry of the layout).

Typically, the via cell in an extraction is represented using a very simple via cell model. For example, the via cell model may just have a single resistance value for an entire via structure (which may include one or more vias). The simple via model allows for faster simulation. However, complex effects of the actual via will be ignored, and could lead to simulation results that are less accurate. This would be a concern for certain paths or nets which are critical to the performance of device.

Then step 410-420, a more complex model of a via cell can be derived. This code will have more components (e.g., resistances) than the simple via cell. For example, if the simple via model has a single resistance, the more complex via model can have a resistance network (e.g., more than a single resistance).

In a step 424, the technique can replace the simple model with the more complex model. The circuitry and integrated circuit design will need to be resimulated to account for the more complex model. A technique of the invention is to reduce the number of blocks that need to be simulated, so not all blocks of the hierarchical need to be simulated. Only the blocks in the dependency path will need resimulation. This saves time and computing resources.

Figure 5A:
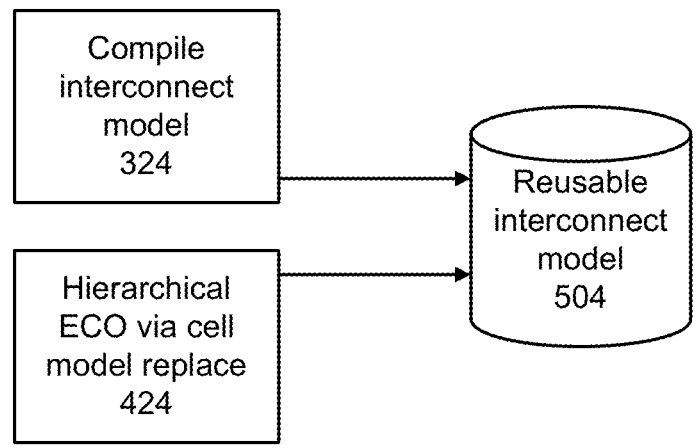
FIG. 5A shows a reusable interconnect model.

FIG. 5A shows a reusable interconnect model 504 is created from the interconnect model generated in step 324. A hierarchical ECO via cell model can be used to replace a given via element or cell with the via cell model generated in step 424.

Figure 5B:
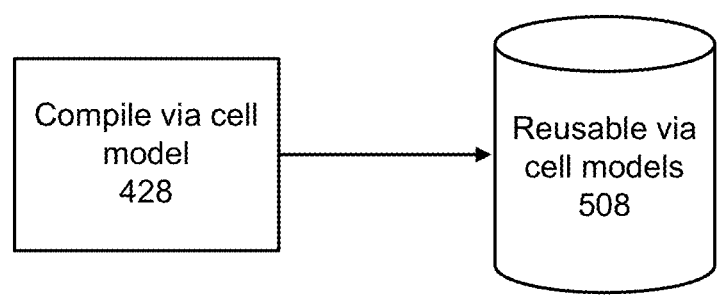
FIG. 5B shows reusable via cell models.

FIG. 5B shows reusable via cell models 508 are created from compile via cell model 428 may checked into a reusable model library. Models from this library may be inserted into the reusable interconnect model.

Figure 6:
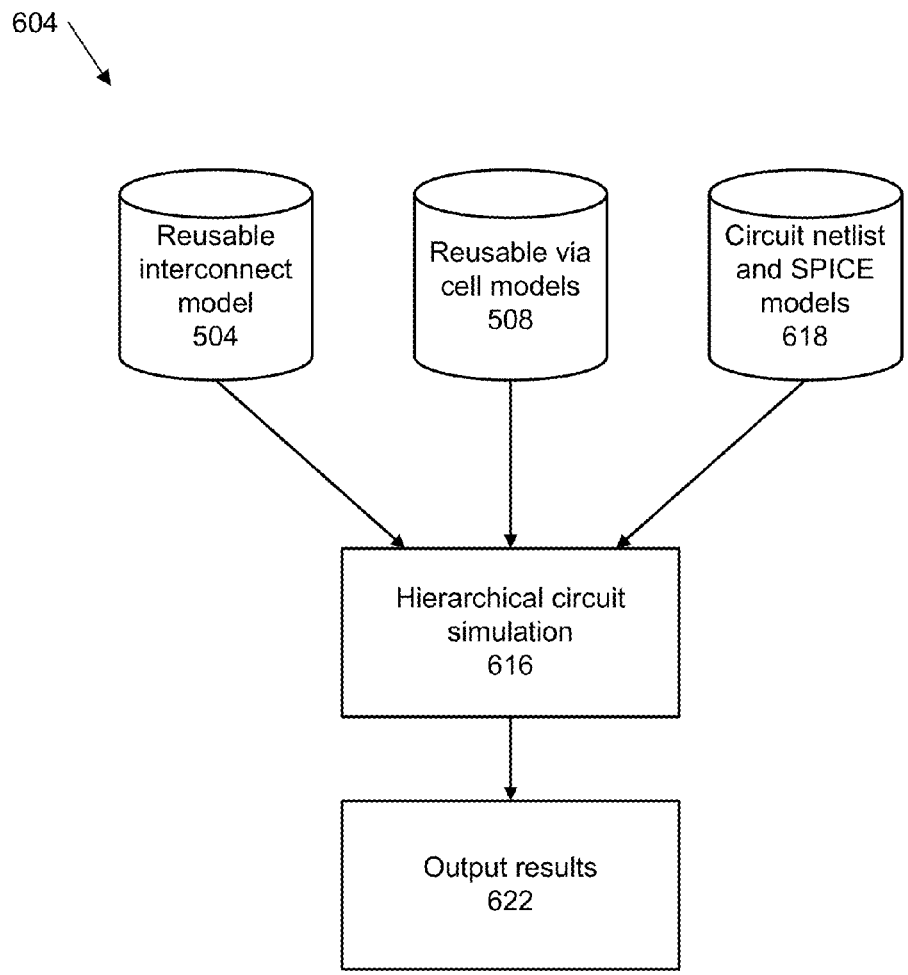
FIG. 6 shows a flow for hierarchical circuit simulation.

FIG. 6 shows a flow 604 for hierarchical circuit simulation 616. The input to the simulation includes reusable interconnect model 504, reusable via cell models 508, and circuit netlist and SPICE models 618. Using these inputs, a hierarchical circuit simulation is performed and produces output results 622. The hierarchical circuit simulation may be performed in a distributed fashion, utilizing multiple processor cores or multiple computers, or both. For example, see U.S. Pat. No. 7,827,016, issued Nov. 2, 2010, and U.S. patent application Ser. Nos. 11/421,212, filed May 31, 2006, and 12/915,362, filed Oct. 29, 2010, which are incorporated by reference. The technique of the invention can work in conjunction with the techniques described by these patent applications.

The results of this simulation will be more accurate because more accurate interconnect resistance information is included in the simulation netlist. As discussed, the via resistance may significantly impact the distributed voltage spanning the geometrical length of the wiring in which the vias are included. This resistance impacts not only power nets but also clock and other signal nets. The system as illustrated in FIG. 3 can improve verification tools which are capable of detecting IR drop and electromigration problems in a design well before manufacturing. This adds significant value to the quality and inherent manufacturability of the design. For example, using the hierarchical circuit simulation, the interconnect netlist does not need to be simplified and the number of elements artificially reduced.

An IC design may contain billions of vias. Despite their potential impact on distributed IR drop and yield, they are typically reduced in typically simulation flows for the simple reason that most simulators are unable to handle their enormous numbers and even if the data volume were not an issue simulation time would be. Most simulators are unable to process hierarchical networks in a hierarchical manner.

As a result, the vast number of vias are typically artificially reduced both in terms of their number as well as in terms of their value. A via array may be reduced during extraction to just one via with an effective resistance corresponding to the via array for example. However, vias are often even set to zero resistance.

Figure 7:
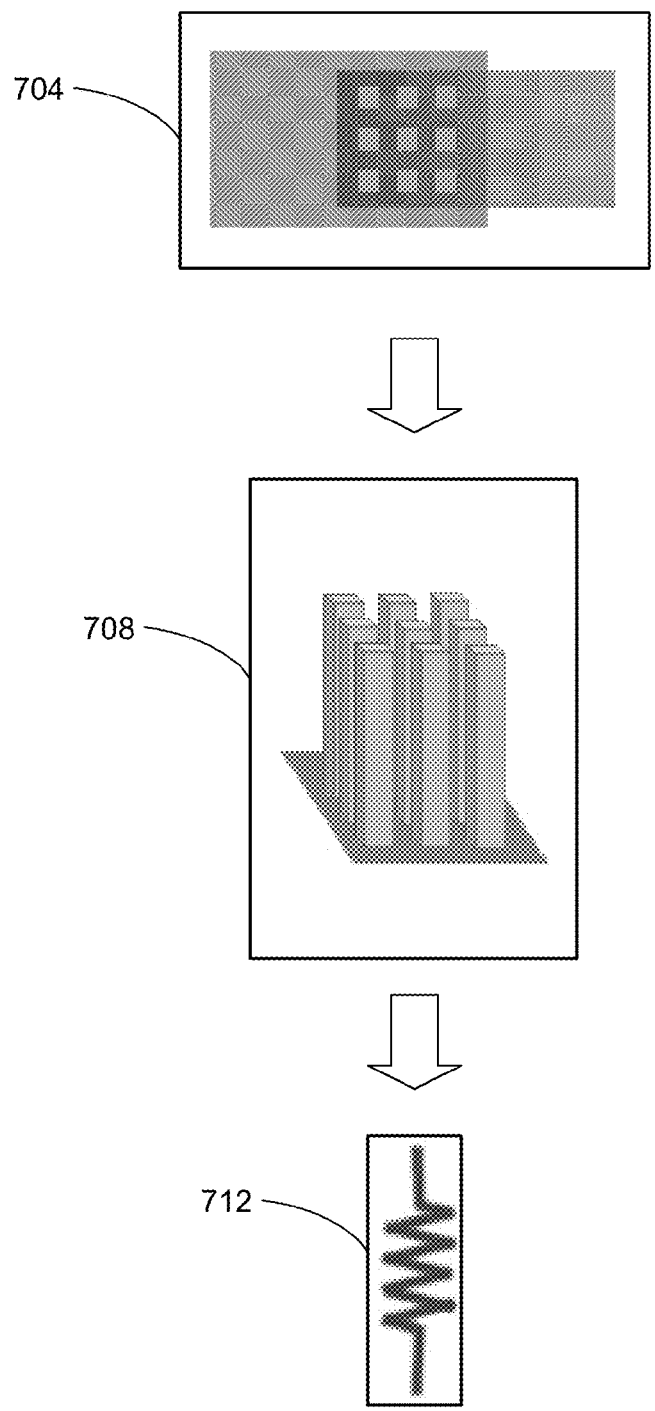
FIG. 7 shows a flow for extracting a via array as a single lumped resistor element.

FIG. 7 illustrates the problem of the reduction method typically used wherein a via array is reduced to a single lumped element. 704, illustrates the via array in a layout. This specific example shows a 3-by-3 via array that connects two different layers of conductors. Via arrays can have any array dimension such as a 1-by-6, 4-by-4, or 25-by-14 via array. Further, a via array may not be a regular array, but rather a collection of vias grouped together.

During interconnect extraction, a model of the physical element is assumed such as shown in 708. Here, the via array is assumed and modeled in an idealized sense. The vias are shown as having the same size and distance from each other (e.g., having the same thickness, width, and length). In a step 712, the modeled via array is extracted and reduced to a single lumped resistor element 712. However, this approach may be a very poor approximation and will generally underestimate resistance and variability which would be seen in the fabricated via array. As a result of this model, a circuit simulation would typically underestimate resistance and current density distribution.

This technique simplifies via arrays into a single lumped element. The distributed nature of current conduction through multiple vias is ignored and there is no clear one-to-one correspondence between the netlist and the layout or simulated silicon structure. Further, this technique is incapable of direct layout mapping of IR drop or electromigration effects.

Vias are very sensitive for a number of reasons including:

(1) Lithographic resolution limit and sensitivity

Wvia=k1*lambda/NA; deep sub-wavelength imaging results.

dLn(I)/dx; very poor edge log slope of actinic intensity (2) Severe proximity effects and layout pattern limited distortion (3) Very high MEF (mask error factor). Mask errors are hugely magnified on the printed wafer.

(4) High aspect ratio trench deposition impacts microstructural density of PVD-solid-angle limited processes.

Up until now, simulation tools have been severely limited in terms of capacity and speed. For a user of these tools, it has typically been necessary to reduce the network size by reducing the circuit into a fewer number of lumped network elements. This reduction can take place in any number of tools including the interconnect extractor as well as the circuit simulator. The end result is inaccuracy and inability to localize errors or specific nodal or branch results to the layout or netlist. Tools from the same company using these approaches do not give the same results. One cannot verify a design adequately particularly given the consequences and cost of failure.

Figure 8:
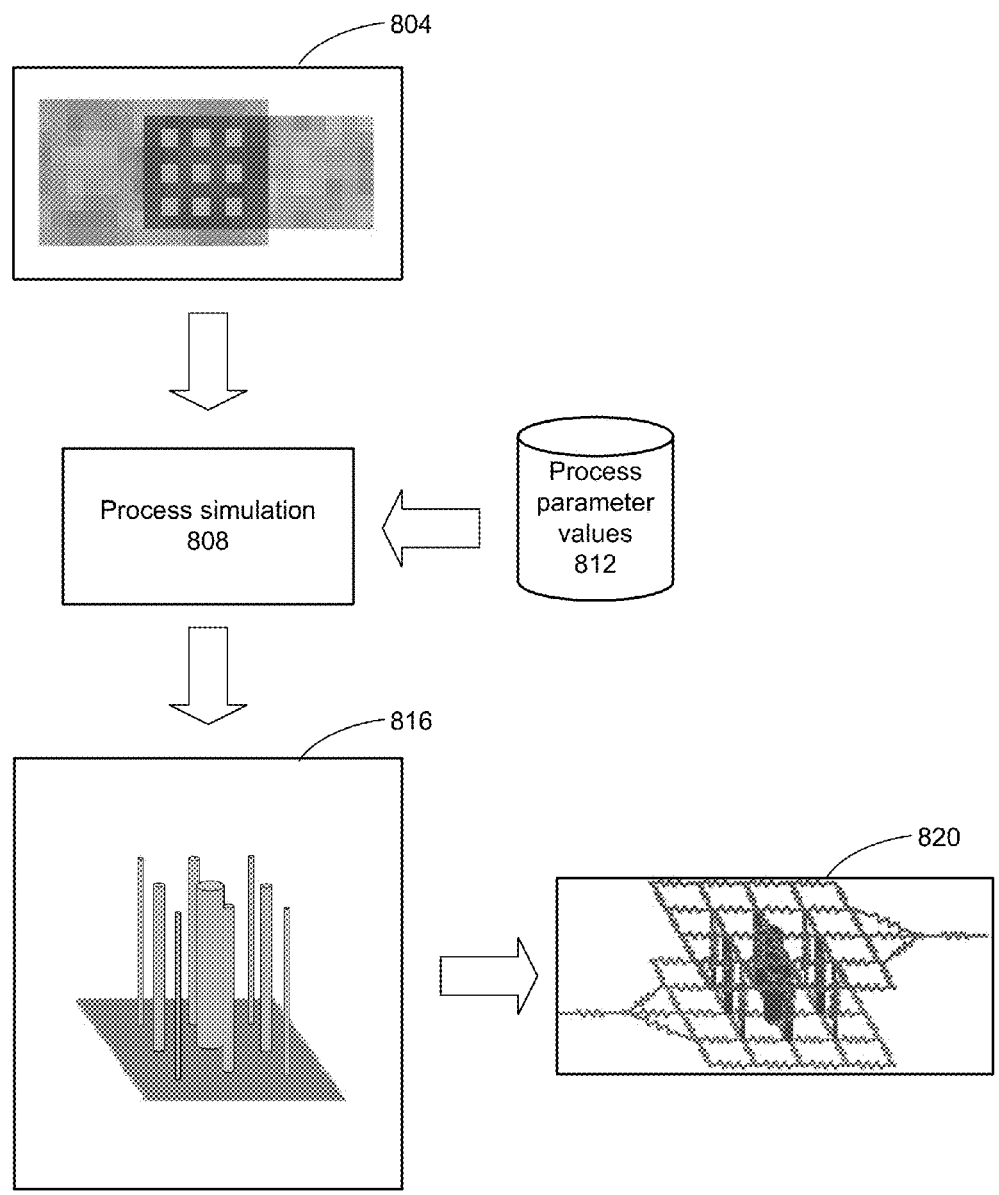
FIG. 8 shows a flow for modeling a via array using a distributed resistance model.

FIG. 8 shows an improved flow for modeling a via array using a distributed resistance model. In a step 804, a via array in a layout is provided. In a step 808, a process simulation is performed on the via array using process parameter values 812 as input. These process parameter values may be stored in a database or file. In a step 816, a distributed via array model is generated, in which vias are treated in a more realistic manner. As shown in the figure, the via arrays are not interpreted as being the same size or distance from each other. Rather, each via has possibly having a different length, width, diameter, or thickness, and different distance from an adjacent via (e.g., such as due to misalignment or optical proximity effects).

In a step 820, the distributed via array model is used to created a three-dimensional (3D) distributed network resistor or resistance model. This distributed via model allows simulation of this via array (and all vias of an integrated circuit) with individual via-level accuracy. This is especially useful for IR drop and electromigration analysis. In this technique, for each unique via class, distributed resistance is modeled accurately with a subcircuit model and compiled.

Using this technique, power networks can be more accurately modeled and a key cause of chip failures can be detected prior to tape-out. The failure mechanism can be shown directly on a layout-level view. Localized IR drop or high-current density are two of the principle failure mechanisms that can be shown or identified in a summary report. Further, this technique allows an aggregate impact of manufacturing variations on voltage distribution or current distribution to be explored at a SPICE-accurate circuit level. As all features are maintained, the simulation results may be mapped directly onto the layout view to show the results spatially.

Figure 9:
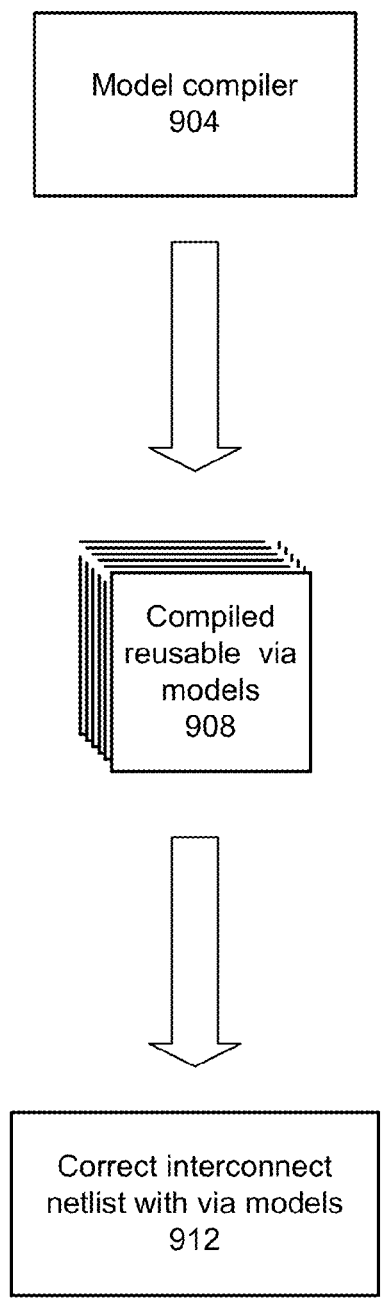
FIG. 9 shows a flow of correcting interconnect netlist with via models.

FIG. 9 illustrates that a family of compiled reusable via models may be generated at one time and checked into a model library. These models may subsequently be inserted into the interconnect netlist. A model compiler 904 is used to compile a family of compiled reusable via models 908. In a step 912, an interconnect netlist is corrected or updated with the compiled reusable via models.

Figure 10A:
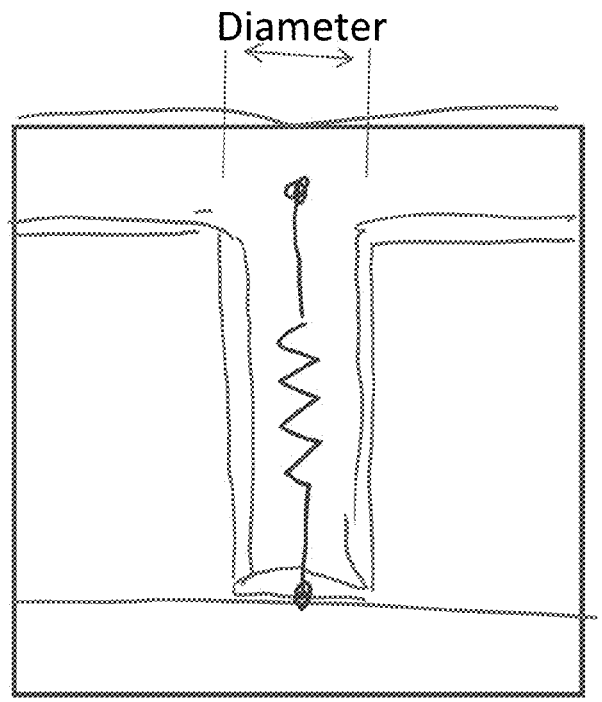
FIG. 10A shows a via with a diameter.
Figure 10B:
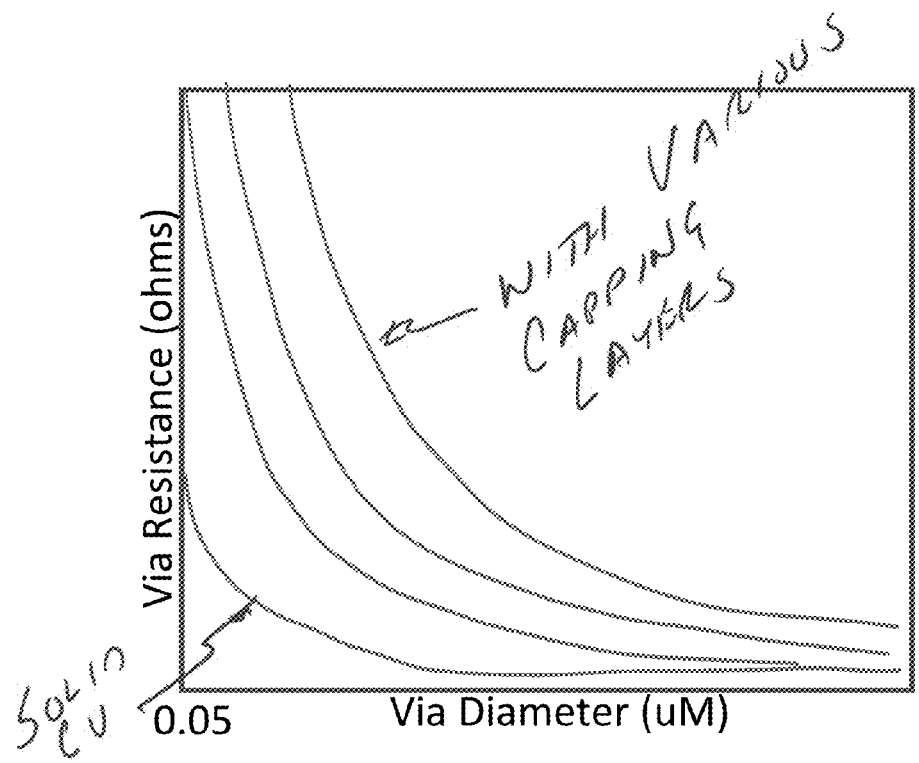
FIG. 10B shows a family of curves relating via resistance in ohms with via diameter in microns.

FIG. 10A shows a single via with a diameter. This via can be modeled with as a resistance based on its diameter. Although drawn in the layout as a square or rectangle, the via after printing or fabrication typically takes on a cylindrical shape due to lithographic patterning and pattern definition effects. In an implementation of the invention, each via is modeled as a cylinder having a diameter rather than a rectangular geometry.

Via resistance is very sensitive to process variations as well as to the size of the via opening. These resistance values may be generated through a mathematical model which is calibrated to experimental data.

FIG. 10B shows a family of curves relating via resistance in ohms to via diameter in microns. These curves may also be represented in a software implementation using a look-up table and an interpolation technique may be used to determine a via resistance based on a given diameter. Different curves represent different via processes. For example, one curve represents a solid copper via. Another curve represents a via with various types of capping layers. Such curves or look-up tables can be used in a software technique or system of the invention.

Figure 11A:
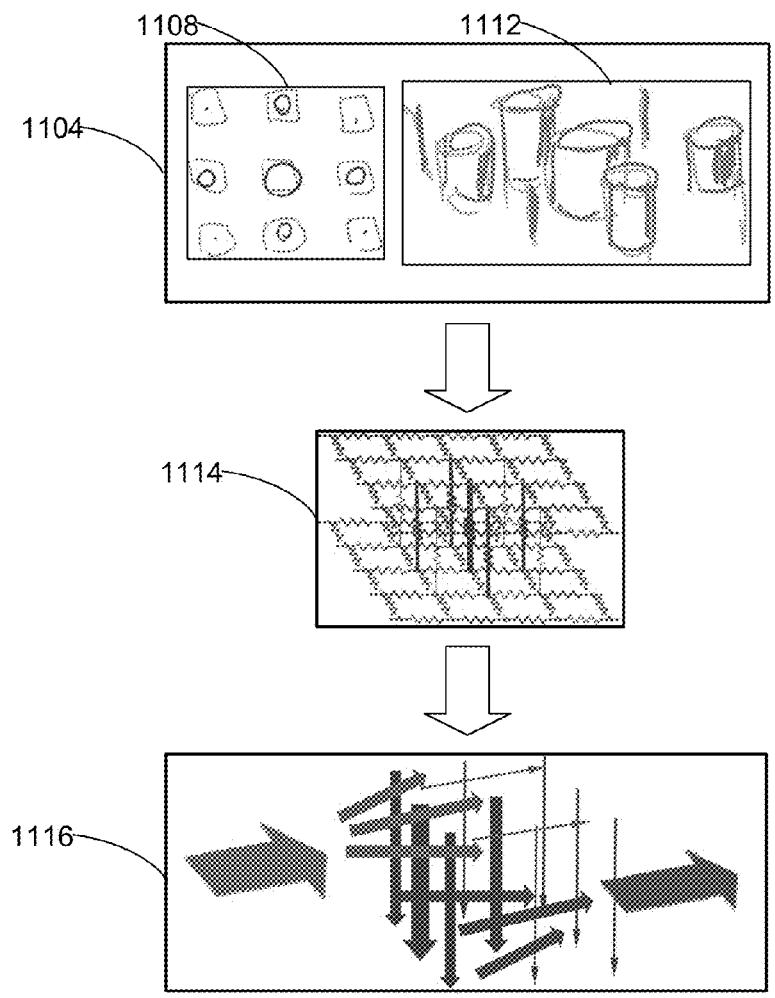
FIGS. 11A-11B show a technique of creating an aerial-image based via resistance-current density distribution model.
Figure 11B:
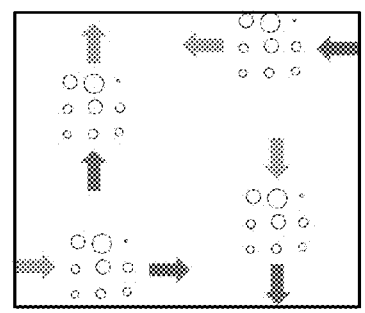

For perfect copper, the via resistance rises quickly with reducing via diameter as expected from any analysis. FIGS. 11A-11B show a technique of creating a calibrated aerial-image based via resistance model. This via shape model is calibrated based on the simulated aerial image together with calibration data take from actual process results. A post etch calibrated scanning electron microscopy (SEM) image or other metrology method may be used to obtain an accurate shape and size measurement data that can be used to finely calibrate the lithography model. For example, SEM images or other measurements can be taken from a fabricated test structure manufactured to help calibrate the via shape model.

In a step 1104, a via array aerial image 1108 is simulated for a copper via array 1112. The diameter sizes of the individual vias can vary. Some vias have a larger diameter than others. In a step 1114, the via array is extracted and a detailed via subcircuit network resistance model is built. The subcircuit model can have different values for each resistance in the via array. This is represented by different sized resistances connecting the upper and lower conductor layers. The via model can be compiled for efficiency and speed, and can be inserted into or used to replace the compiled via models in a compiled interconnect model.

In a step 1116, current distribution and density is illustrated based on the via network resistance model. It is shown that the distribution of current passing through the via array is not uniform and depends upon the directionality as well as the distributed resistance. The accuracy of the approach described enables this type distributed current density simulation. This approach naturally and properly considers the current direction and enables via verification and a better via array design for IR drop robustness and electromigration lifetime.

Typically extraction and some simulation programs reduce via arrays to simplify the circuit and minimize capacity. This results in lumping parallel resistors, disregarding layer resistance, and current distribution-direction. For electromigration analysis-verification, an accurate model of current distribution is useful to allow a user to ascertain which, if any, vias are conducting more current than allowable.

FIG. 11B shows, for the same input current, current distributions in vias are not equal. Depending on the direction current flows through the via array, the same via array will present a different resistance distribution to the network. This may affect performance or yield. An embodiment of the invention treats this and does so hierarchically. Further, in the general case and for a non-centro-symmetric cell, there is a distributed resistance, inductance, and capacitance, and this RLC may be expressed as an array and treated as a multiport mesh in simulation.

Figure 12:
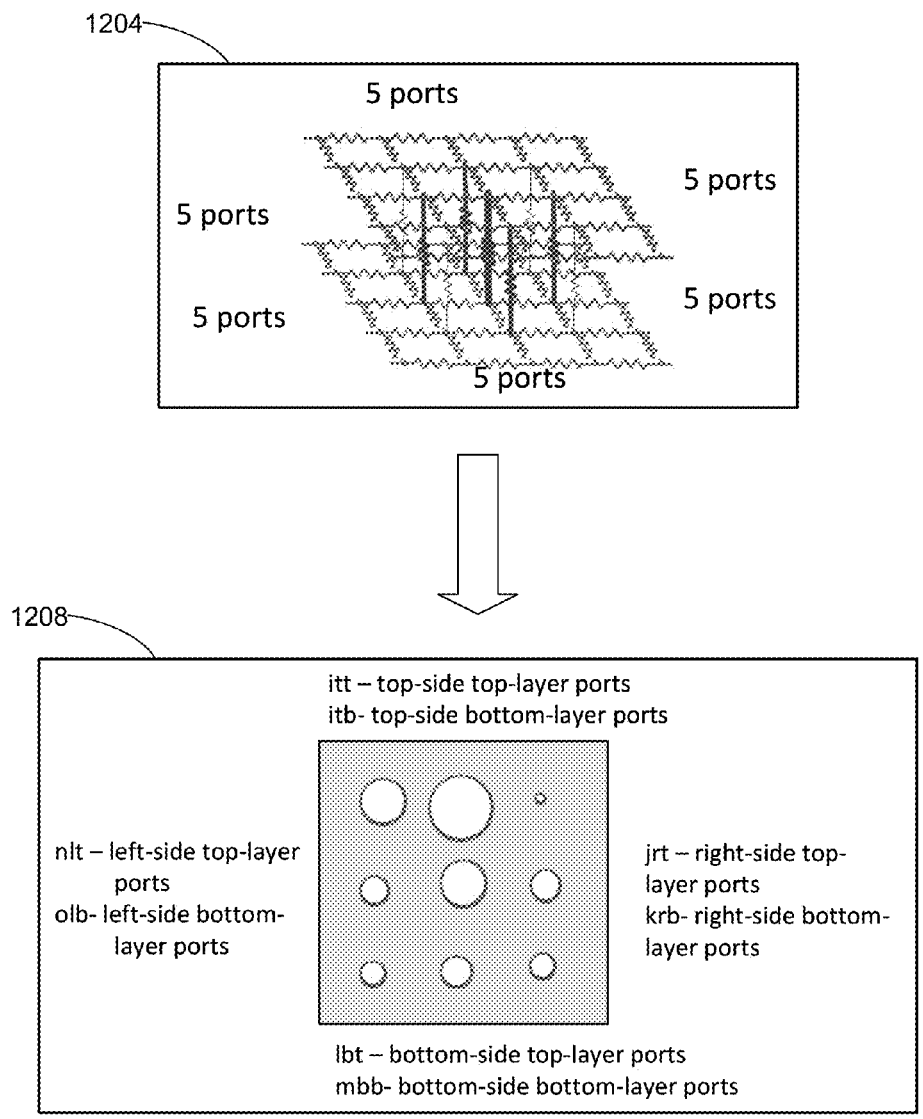
FIG. 12 shows a flow for compiling compiled a multiport netlist model.

FIG. 12 shows a flow for compiling a multiport netlist model. In a step 1204, a general RLC multiport subcircuit model is provided. This RLC array example has five ports on each side (four sides) of each layer (two layers). So there are a total of 40 ports. The subcircuit model can be used to enable hierarchical reuse for hierarchical via model instances which have differing connections to the via resistance array.

In a step 1208, the subcircuit model is compiled which enables the model to be fast, efficient, and usable as a replacement model for instances which have the same patterned via shape distribution. The multiport compiled netlist model has top-side top-layer ports (itt), top-side bottom-layer ports (itb), right-side top-layer ports (jrt), right-side bottom-layer ports (krb), bottom-side top-layer ports (lbt), bottom-side bottom-layer ports (mbb), left-side top-layer ports (nlt), and left-side bottom-layer ports (olb).

Given the lithographic asymmetry in the general case, there may be orientation dependence. This would be handled as a cell-based design.

Figure 13:
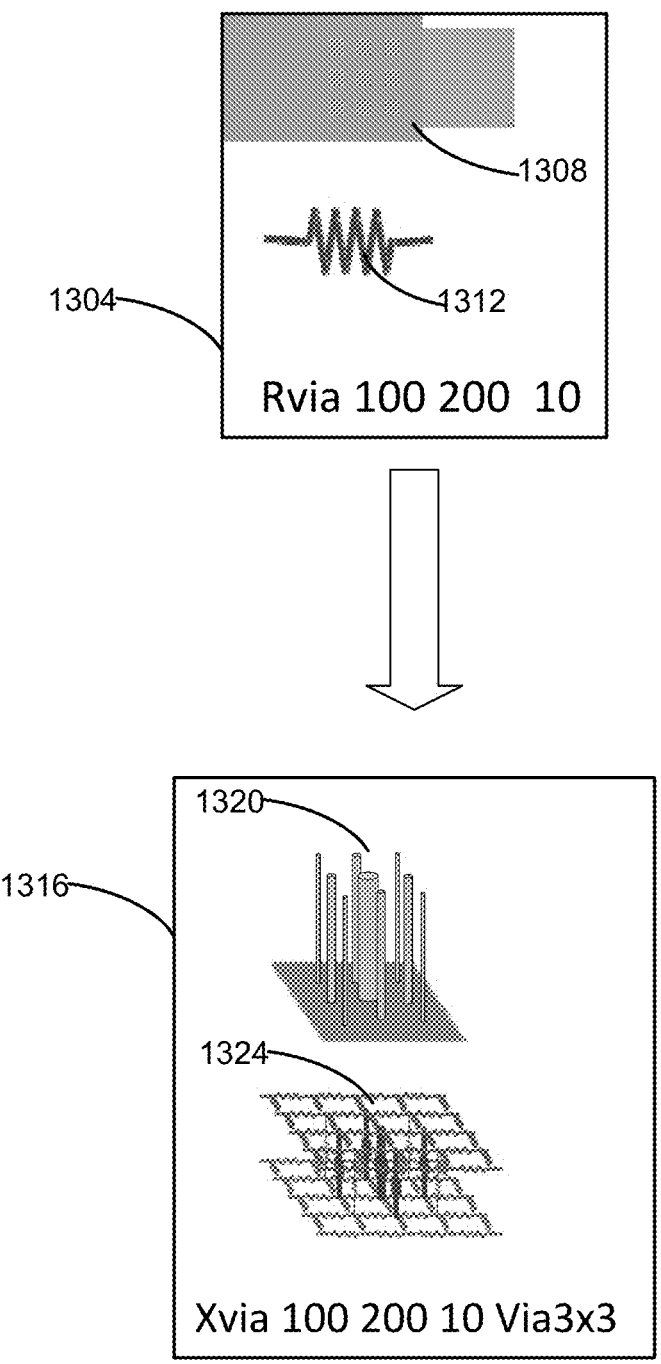
FIG. 13 shows a technique of updating or replacing network elements or cells with a more accurate simulation-based model.

FIG. 13 shows a technique of updating or replacing extracted network elements or cells with a more accurate simulation-based model. The technique uses a rip-out and replace network elements or cells approach. This may also be considered to be an extraction repair method enabling a more accurate model of via to be replaced by the hierarchical via model.

Interconnect parasitic (RLCK) extractors cannot typically handle large detailed silicon-level image layers. An alternative approach is to extract a specific RLCK element or cell from the ideal layout and then ripout-and-replace this element or cell with the silicon-level detail element or cell. This approach may be done hierarchically while also dealing with space-dependent effects.

In particular, as was discussed previously, a simplified via model was used in a netlist. In a step 1304, a specific via array element or cell 1308 is provided and extracted to obtain a simplified extracted via model 1312 (e.g., a single resistor). A line such as "Rvia 100 200 10" is placed in a netlist, (such as in typical SPICE-like netlist), to specify this reduced extraction model resistance. For example, this line indicates the resistance between nodes 100 and 200 is 10 ohms.

The simplified via model is replaced with a more accurate and complete distributed resistance model. In particular, in a step 1316, the via cell is modeled as using a more accurate physical structure 1320 from simulation. As was previously described, the individual vias can have different sizes and diameters. A distributed resistance model 1324 is generated and compiled.

A line such as "Xvia 100 200 10 Via3×3" is placed in the via netlist to represent this distributed via resistance model. This line may be used to replace the "Rvia 100 200 10" line previously in the via netlist. The new line has an identifier to specify a model (e.g., the "Via3×3" model) that provides a more accurate model of the via, taking into consideration the differently sized vias and variation in resistances.

Figure 14:
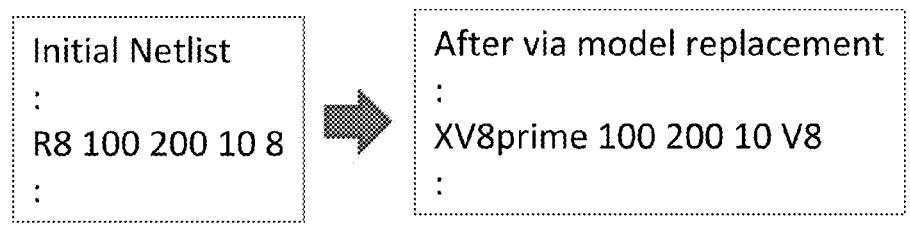
FIG. 14 shows replacing a netlist element or cell with a more accurate model.

FIG. 14 shows replacing a netlist element or cell with a more accurate model. An ideal via cell in a given interconnect netlist can be replaced with a more accurate simulated via cell subcircuit or compiled via cell model as shown previously. For example, the initial netlist may have a line "R8 100 200 10 8" and this line is replaced by "XV8prime 100 200 10 V8." By replacing the line, this gives a more accurate via model. The via cell is referenced like a subcircuit but uses the compiled via cell model if available. When a via cell is influenced by proximity effects such that it may not be used in general application it may be required to use a model of that specific case.

After an interconnect netlist is compiled, models exist for all subcircuits in the netlist. A specific element may be replaced with another element or with a model as was discussed previously allowing vias to be replaced to "repair" an extraction netlist to insert the reusable via model. Subsequently, the overall interconnect simulation may be run. The hierarchical simulator is able to reuse any model which is not in a dependency path of the inserted reusable via model. Therefore significant simulation time is saved as relatively few hierarchical cells will need to be regenerated.

Figure 15:
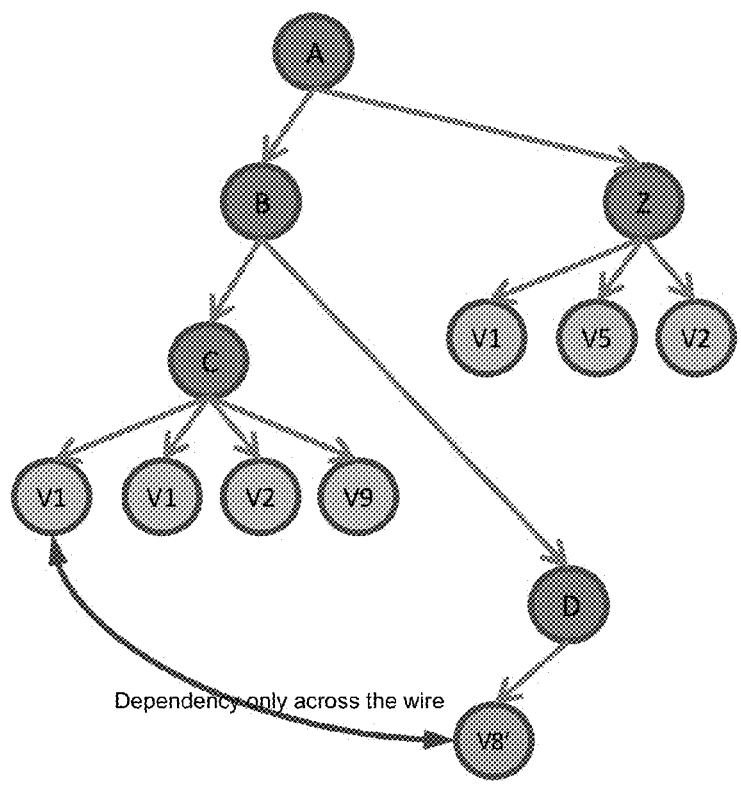
FIG. 15 shows hierarchical tree structure of circuit block cells for a circuit.

FIG. 15 shows a hierarchical tree structure of circuit block cells for a circuit. Cell A has subcells B and Z. Cell B has subcells C and D. Cell C has subcells V1, V1, V2, and V9. Cell Z has subcells V1, V5, and V2. Cell D has a subcell V8' that has a dependency across a wire to V1, which is a subcell to cell C. This dependency is indicated by a line between these two cells. Other dependencies may occur as well, however for this description we simplify.

Subcells V1, V1, V2, and V9 of cell C and subcells V1, V5, and V2 of cell Z represent existing via elements or models. Cells A, B, C, D, and Z represent independent circuit blocks which have been precompiled.

V8_1*, V8*, V1*, V9*, V4*, and V3* are precompiled hierarchical via models. V8_1* is a variant instance due to spatial proximity effects. A Hierarchical ECO single via change (e.g., V8 to V8*) requires recomputation of models only if they are in a dependency path. This reduces the number of cells that need to be recomputed in order to obtain the solution, and reduces the overall simulation time. The reduction in simulation time can be quite significant.

The cells that are to be recomputed are a very small fraction of the overall network resulting in great computational and time savings. The same applies when a large number of vias is changed thru hierarchical ECO. This change can be done quickly and it enables far greater accuracy with little impact on computational speed.

Figure 16A:
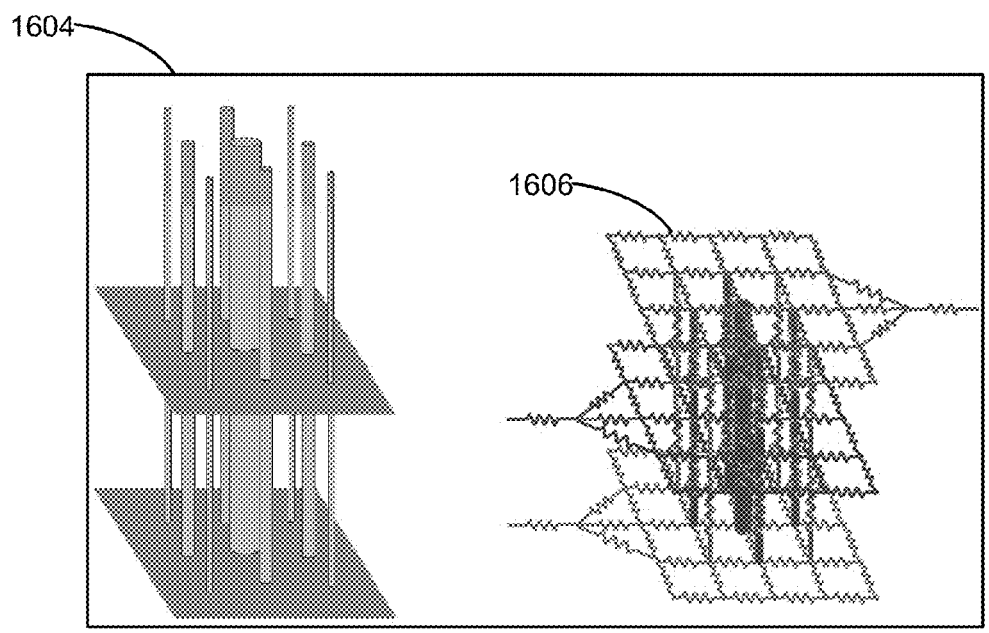
FIGS. 16A-16B show a technique of the invention applied to two or more layers of vias and three or more layers of conductors.
Figure 16B:
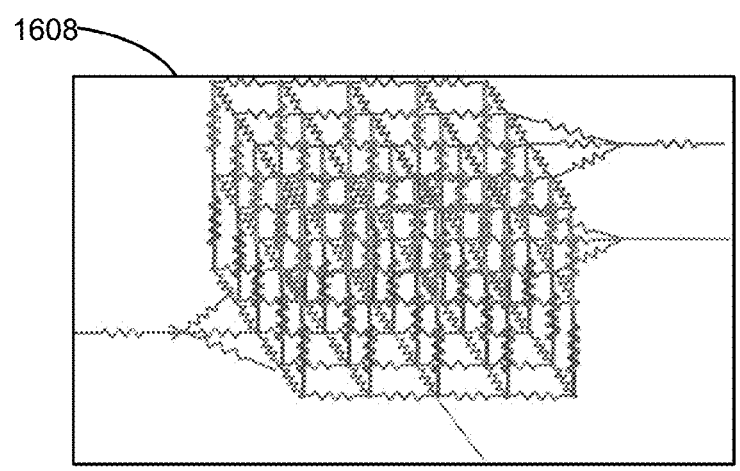

FIGS. 16A-16B show a technique of the invention applied to two or more layers of vias and three or more layers of conductors. The previous discussion has described two layers of conductors and one layer of vias in order to more easily describe the principles of the invention without undue complexity. However, the technique is applicable to any number of levels, layers, stacking, and nesting of vias and conductors. The technique applies to any level of complexity and nesting of vias. The compiled model will run quickly and the nodal and branch values can be viewable in the exact network context as well as on the layout.

In FIG. 16A, reference number 1604 shows stacked vias where each level of via is represented accurately (e.g., independent diameter sizes for each via). This representation is extracted into a distributed resistance model 1606 for the stacked vias on two layers, within a conductor layer between them and other conductor layers above and below the stack.

FIG. 16B shows a generalized RLC multiport via structure 1608 including systems which leak current to other structures. There are two layers of vias and three layers of conductors. The vias are stacked on each other. This model may be particularly applicable to TSV structures for 3D-IC technology which may inject current into the body of chip.

Figure 17:
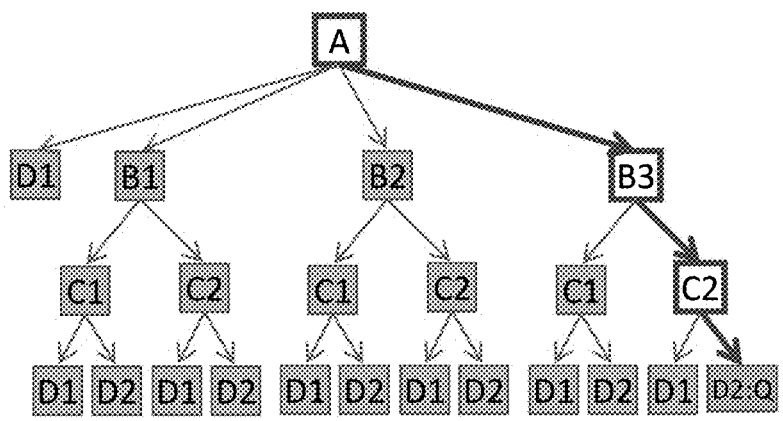
FIG. 17 shows a hierarchical tree structure of circuit blocks with a sample dependency path.

FIG. 17 shows a hierarchical tree structure, with a sample dependency path. This is a hierarchical tree of circuit blocks of an integrated circuit design. This tree has four levels. Each block depends on blocks in a lower level, beneath it. For example, block B1 depends on blocks C1 and C2. A hierarchical tree structure for an integrated circuit design can have any number of levels and dependencies.

Block D2:Q can be representative of a via cell model (or other component model) that has been changed from a simple to a more complex model (e.g., X resistances to more than X resistances). Then the blocks that need to be resimulated are changed block D2:Q and the blocks in the dependency path for D2:Q. These would be blocks C2, B3, and A. Other blocks in the hierarchical tree structure would not need to be resimulated. This feature of the invention will result in a great time savings and savings in computing resources. In particular, there are 23 blocks in the tree, and only 4 of those blocks will be resimulated.

This description of the invention has been presented for the purposes of illustration and description. It is not intended to be exhaustive or to limit the invention to the precise form described, and many modifications and variations are possible in light of the above discussion. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing an extraction of an integrated circuit design;
using the extraction, compiling an interconnect model, comprising a via cell represented by a first via cell model comprising at least X resistance values, wherein X is an integer 1 or greater;
using the extraction, compiling a plurality of second via cell models, each comprising a via cell represented by at least Y resistance values, wherein Y is an integer greater than X;
indicating a selected net of the integrated circuit design;
using at least one processor, performing a circuit simulation on the integrated circuit design using cells of the interconnect model and second via cell models comprising:
for at least one via with the selected net, substituting a first via model associated of the interconnect model corresponding to the at least one via with one of the second via models, while other via cells not associated with the selected net continue to be represented using the first via model;

calculating simulation results for a first block of the integrated circuit design using a substituted second via model; and calculating simulation results for a second block of the integrated circuit design, wherein in a tree of the integrated circuit design, the second block is linked to the first block, and the second block is hierarchically above the first block.

2. The method of claim 1 wherein the second block is directly linked to the first block without passing through another block.

3. The method of claim 1 wherein
the calculating simulation results for a first block of the integrated circuit design using a substituted second via model is performed using a first processor core, and
the calculating simulation results for a second block of the integrated circuit design is performed using a second processor core.

4. The method of claim 1 wherein the compiling a plurality of second via cell models comprises:
performing a computation to obtain a newly computed via model.

5. The method of claim 4 wherein the performing a computation to obtain a newly computed via model comprises:
extracting the given via cell's geometries from the extraction;
indexing via size and resistance using a calibrated model of the resistance versus via size distribution for a process technology; and
generating subcircuits for the given via cell.

6. The method of claim 4 wherein the performing a computation to obtain a newly computed via model comprises:
calibrating the given via cell based on an simulated aerial image of a via to obtain the newly computed via model.

7. The method of claim 5 wherein a subcircuit comprises a multiport structure comprising:
at least X by Y vias between first layer and second layers of a net;
at least X+2 ports on first and second sides of the first layer;
at least X+2 ports on first and second sides of the second layer;
at least Y+2 ports on third and fourth sides of the first layer; and
at least Y+2 ports on third and fourth sides of the second layer.

8. The method of claim 1 comprising:
after the substituting a first via model associated of the interconnect model corresponding to the at least one via with one of the second via models, performing the following:
determining a voltage associated with each node of the integrated circuit design;
identifying independent loops of the design;
summing the voltages for each identified loop and storing the loop sum results;
summing the currents at each node of the design and storing the node sum results;
summing power consumption of each branch of the design and storing the total branch power;
storing input power to the design;
indicating a not-validated condition when at least one of the loops in the design has a nonzero sum;

indicating a not-validated condition when at least one of the nodes in the design has a nonzero sum; and
indicating a not-validated condition when an input power to the circuit is different from the total branch power.

9. The method of claim 1 wherein the calculating simulation results for a first block of the integrated circuit design using a substituted second via model comprises:
determining a direction of current flow through the substituted second via model.

10. The method of claim 1 wherein the calculating simulation results for a first block of the integrated circuit design using a substituted second via model comprises:
determining whether a current density distribution through the substituted second via model is above a threshold; and
displaying an indication on a computer display that the current density distribution is above the threshold.

11. The method of claim 1 wherein the selected net is a clock net of the integrated circuit design.

12. A method comprising:
providing a first extraction model of an integrated circuit design, wherein the first extraction model comprises a first via model where a via cell of the integrated circuit design is represented with a least X resistance values, wherein X is an integer 1 or greater;
using at least one processor, providing first simulation results for the integrated circuit design using the first extraction model, wherein the first simulation results are partitioned according first blocks in a hierarchy of the integrated circuit design;
using the first extraction model, selecting a selected net of the integrated circuit design for a second extraction model;
generating the second extraction model of the integrated circuit design by replacing at least one via cell associated with the selected net with a second via model comprising a via cell represented with at least Y resistance values while other via cells not associated with the selected net continue to be represented using the first via model, wherein Y is an integer greater than X; and
using the second extraction model, simulating the selected net of the integrated circuit design comprising at least one via cell associated with the selected net using the second via model, wherein the simulating comprises:
reusing first simulation results of the first blocks that do not have a dependency on the at least one via cell associated with the selected net;
calculating second simulation results of second blocks of the integrated circuit design that have a dependency on the at least one via cell associated with the selected net; and
outputting third simulation results for the integrated circuit design comprising the first and second simulation results.

13. The method of claim 12 wherein calculating second simulation results of second blocks of the integrated circuit design are blocks hierarchically above the first block.

14. The method of claim 12 wherein generating the second extraction model of the integrated circuit design by replacing at least one via cell associated with the selected net with a second via model, further comprises the via cell with a direction of current flow.

15. The method of claim 12 wherein the outputting third simulation results for the integrated circuit design comprising the first and second simulation results further comprises:
determining whether a current density distribution through the at least one via cell is above a threshold; and displaying an indication on a computer display that the current density distribution is above the threshold.

16. A method comprising:

providing an extraction of an electronic component;

using the extraction, compiling an interconnect model, comprising a circuit represented by a first model comprising at least X electrical parameter values, wherein X is an integer 1 or greater;

using the extraction, compiling a plurality of second models, each comprising a circuit cell represented by at least Y electrical parameter values, wherein Y is an integer greater than X;

indicating a system of the electronic component;

using at least one processor, performing a circuit simulation on the electronic component using cells of the interconnect model and second cell models comprising:

for at least one circuit with the system, substituting a first model associated of the interconnect model corresponding to the at least one circuit with one of the second models, while other circuit cells not associated with the system continue to be represented using the first model;

calculating simulation results for a first block of the electronic component using a substituted second model; and after the substituting a first model associated of the interconnect model corresponding to the at least one circuit with one of the second models, performing the following:

determining a voltage associated with each node of the integrated circuit design;

identifying independent loops of the design;

summing the voltages for each identified loop and storing the loop sum results;

summing the currents at each node of the design and storing the node sum results;

summing power consumption of each branch of the design and storing the total branch power;

storing input power to the design;

indicating a not-validated condition when at least one of the loops in the design has a nonzero sum;

indicating a not-validated condition when at least one of the nodes in the design has a nonzero sum; and indicating a not-validated condition when an input power to the circuit is different from the total branch power.

17. The method of claim 16 wherein the compiling a plurality of second cell models comprises:

for a given circuit cell in the extraction, obtaining a corresponding spatial representation of the graphical given circuit cell in a design layout of the electronic component;

comparing the spatial representation of the graphical given circuit cell against a database of third circuit cells, previously compiled;

when a match to the given circuit cell is found in the database, assigning the matched previously compiled third circuit cell as a second cell model corresponding to the given circuit cell;

when a match to the given circuit cell is not found in the database, performing a computation to obtain a newly computed model as a second circuit cell corresponding to the given circuit cell.

18. The method of claim 16 wherein the calculating simulation results for a first block of the electronic component using a substituted second model comprises:

determining whether a current density distribution through the substituted second model is above a threshold; and displaying an indication on a computer display that the current density distribution is above the threshold.

* * * * *